(12) United States Patent
Chun et al.

(10) Patent No.: US 8,593,020 B2
(45) Date of Patent: Nov. 26, 2013

(54) ELECTRIC MOTOR AND ELECTRIC VEHICLE HAVING THE SAME

(75) Inventors: Kwangwook Chun, Seoul (KR); Jaeho Kim, Seoul (KR); Yunho Kim, Seoul (KR); Seungdo Han, Seoul (KR); Jiseong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 170 days.

(21) Appl. No.: 13/232,236

(22) Filed: Sep. 14, 2011

(65) Prior Publication Data
US 2012/0153749 A1    Jun. 21, 2012

(30) Foreign Application Priority Data
Dec. 15, 2010  (KR) .................. 10-2010-0128669

(51) Int. Cl.
*H02K 9/00* (2006.01)
(52) U.S. Cl.
USPC .............................. 310/52; 310/58
(58) Field of Classification Search
USPC .......................... 310/52, 54, 58, 64
See application file for complete search history.

(56) References Cited

U.S. PATENT DOCUMENTS

| 7,511,399 B2* | 3/2009 | Lung et al. ............ 310/216.055 |
| 8,161,643 B2* | 4/2012 | Smith et al. .............. 29/890.03 |
| 2002/0067086 A1* | 6/2002 | Kikuchi et al. ................ 310/54 |
| 2004/0189128 A1* | 9/2004 | Joong et al. .................... 310/152 |
| 2008/0061645 A1* | 3/2008 | Yukitake ........................ 310/89 |

FOREIGN PATENT DOCUMENTS

| JP | 2009-033884 A | 2/2009 |
| JP | 2010-158124 A | 7/2010 |
| KR | 20-1998-015912 U | 6/1998 |
| KR | 10-2011-0075824 A | 7/2001 |

* cited by examiner

*Primary Examiner* — Nguyen N Hanh
(74) *Attorney, Agent, or Firm* — McKenna Long & Aldridge LLP

(57) ABSTRACT

A motor for an electric vehicle includes a frame, a stator disposed in the frame, a rotor disposed to be rotatable with respect to the stator; and an engaging portion that restricts the stator from moving with respect to the frame in a circumferential direction, the engaging portion including at least one rib protruding from one of the surfaces of the frame and the stator, and at least one rib accommodation portion formed at other of the surfaces of the frame and the stator, wherein the at least one rib and the at least one accommodation portion are engaged to allow heat to be transferred therebetween. Under this configuration, a cooling performance may be improved and durability may be enhanced.

18 Claims, 9 Drawing Sheets

ELECTRIC MOTOR AND ELECTRIC VEHICLE HAVING THE SAME

CROSS-REFERENCE TO RELATED APPLICATION

The present disclosure relates to subject matter contained in priority Korean Application No. 10-2010-0128669, filed on Dec. 15, 2010, which is herein expressly incorporated by reference in its entirety.

BACKGROUND OF THE INVENTION

1. Field of the Invention

This specification relates to an electric motor and an electric vehicle having the same, and particularly, to an electric motor capable of enhancing a cooling performance by increasing a heat exchange area between components, and an electric vehicle having the same.

2. Background of the Invention

Generally, a motor or an electric motor (hereinafter, will be called 'electric motor') is an apparatus for converting electric energy into mechanical energy.

This electric motor may be categorized into a direct current (DC) motor and an alternating current (AC) motor according to used power.

The AC motor includes a three-phase AC motor and a single-phase AC motor, and each AC motor has an induction motor and a synchronous motor.

The induction motor has many advantages, such as direct connection to power, a simplified and rigid structure and low prices, and can be easily dealt. Accordingly, the induction motor is being widely used.

Recently, the electric motor is being adopted as a driving source of vehicles including automobiles, so as to reduce environmental pollutions due to harmful gases occurring when fuels of the vehicles are combusted, and so as to reduce the amount of resources (fuels).

The electric motor used as a driving source of an electric vehicle may comprise a frame having an accommodation space therein, a stator disposed in the frame, and a rotor disposed to be rotatable with respect to the stator.

The electric motor for an electric vehicle may generate heat of high temperature due to its large capacity. More concretely, when the electric motor is driven, heat of high temperature may be generated from the stator due to copper loss and/or iron loss or core loss.

For cooling, the electric motor for an electric vehicle may be provided with cooling means.

The cooling means may be configured to cool the frame, for instance.

As the cooling means, may be used an air-type cooling means for cooling the frame by blowing air with using a fan, and a water-type cooling means for cooling the frame by using a liquid such as water.

However, the conventional electric motor may have the following problems.

Firstly, since a contact area between the stator and the frame is not wide, heat generated from the stator may not be rapidly transmitted to the frame. This may cause the stator and the rotor to have increased temperatures. If the temperatures of the stator and the rotor are excessively high, copper loss and iron loss may be increased. This may lower an output and efficiency.

Furthermore, since the stator and the frame are respectively formed in a circular shape, the stator may perform a relative rotation in a circumferential direction with respect to the frame when the electric motor is driven. This may shorten the lifespan of the electric motor.

SUMMARY OF THE INVENTION

Therefore, an aspect of the detailed description is to provide an electric motor capable of enhancing a cooling performance by increasing a heat exchange area between components, and an electric vehicle having the same.

Another aspect of the detailed description is to provide an electric motor capable of enhancing a cooling performance and durability, and an electric vehicle having the same.

To achieve these and other advantages and in accordance with the purpose of this specification, as embodied and broadly described herein, there is provided an electric vehicle including a body, a plurality of wheels provided at the body, an electromotor to drive at least one wheel, the electromotor including a frame, a stator disposed in the frame, a rotor disposed to be rotatable with respect to the stator, and an engaging portion that restricts the stator from moving with respect to the frame in a circumferential direction, the engaging portion including at least one rib protruding from one of surfaces of the frame and the stator, and at least one rib accommodation portion formed at an other opposing surface of the surfaces of the frame and the stator, wherein the at least one rib and the at least one accommodation portion are engaged to allow heat to be transferred therebetween, a battery provided in the body; and an inverter coupled between the battery and the electromotor, the inverter including a plurality of elements to convert direct current (DC) power to alternating current (AC) power.

Here, a surface of the at least one rib may make contact with a surface of the at least one rib accommodation portion.

The at least one rib may include a plurality of ribs formed to be spaced from each other by a predetermined pitch at one of the surfaces of the frame and the stator.

The at least one rib accommodation portion may include a plurality of rib accommodation portions formed to be spaced from each other by a predetermined pitch at one of the surfaces of the frame and the stator.

At least one cooling path may be formed at the frame.

The electric vehicle may further include a cooling path formed at the at least one rib.

The electric vehicle may further include a cooling path formed at the frame in a vicinity of the at least one rib accommodation portion.

The at least one cooling path may include a plurality of cooling paths, each cooling path may penetrate the frame from one end surface to another end surface of the frame.

The electric vehicle may further include at least two covers that one cover covers the one end surface of the frame and another cover covers the another end surface of the frame, and at least one communication portion formed at one of the at least two covers, and the at least one communication portion may connect at least two of the cooling paths.

The electric vehicle may further include at least one inlet in fluid communication with at least one of the cooling paths, at least one outlet in fluid communication with the at least one of the cooling paths, and a cooling fluid circulation circuit coupled to the at least one of the inlet and the at least one of the outlet to form a fluid flow path According to another aspect of the present invention, there is provided a motor for an electric vehicle including a frame, a stator disposed in the frame, a rotor disposed to be rotatable with respect to the stator, and an engaging portion that restricts the stator from moving with respect to the frame in a circumferential direction, the engaging portion including at least one rib protruding from one of the surfaces of the frame and the stator, and at least one rib accommodation portion formed at other of the surfaces of the frame and the stator, wherein the at least one rib and the at least one accommodation portion are engaged to allow heat to be transferred therebetween.

Here, a surface of the at least one rib may make contact with a surface of the at least one rib accommodation portion.

The at least one rib may include a plurality of ribs formed to be spaced from each other by a predetermined pitch at one of the surfaces of the frame and the stator.

The at least one rib accommodation portion may include a plurality of rib accommodation portions formed to be spaced from each other by a predetermined pitch at one of the surfaces of the frame and the stator.

At least one cooling path may be formed at the frame.

The motor may further include a cooling path formed at the at least one rib of the frame.

The motor may further include a cooling path formed at the frame in a vicinity of the at least one rib accommodation portion.

The at least one cooling path may include a plurality of cooling paths, and each cooling path may penetrate the frame from one end surface to another end surface of the frame.

The motor may further include at least two covers that one cover covers the one end surface of the frame and another cover covers the another end surface of the frame, and at least one communication portion formed at one of the at least two covers, and the at least one communication portion may connect at least two of the cooling paths such that a zigzag fluid flow path is formed.

The motor may further include at least one inlet in fluid communication with at least one of the cooling path, and at least one outlet in fluid communication with at least one of the cooling path.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, preferred embodiments of the present invention will be explained in more details with reference to the attached drawings.

Figure 1:
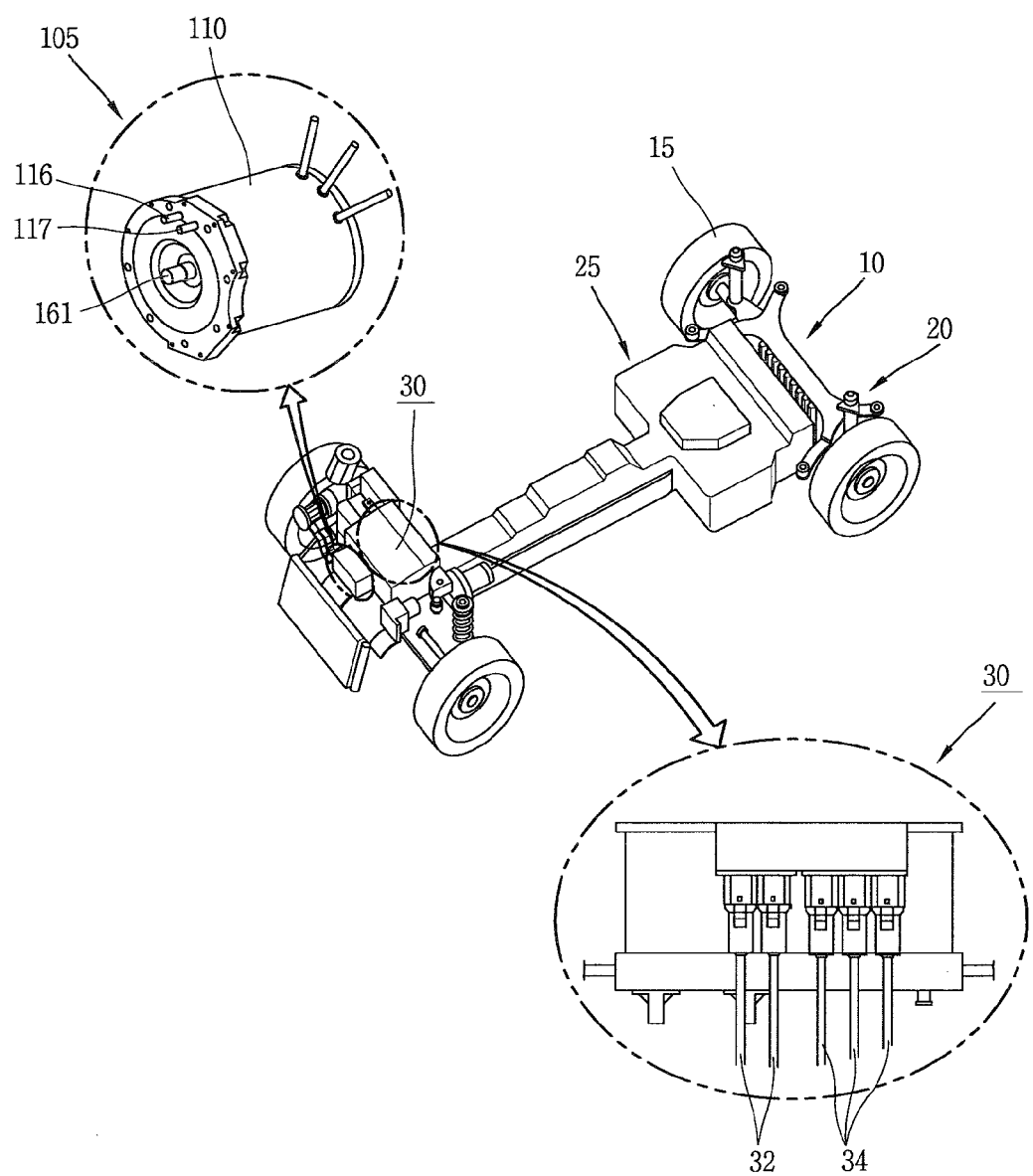
FIG. 1 is a schematic view showing an electric vehicle having an electric motor according to an exemplary embodiment of the present invention.
Figure 2:
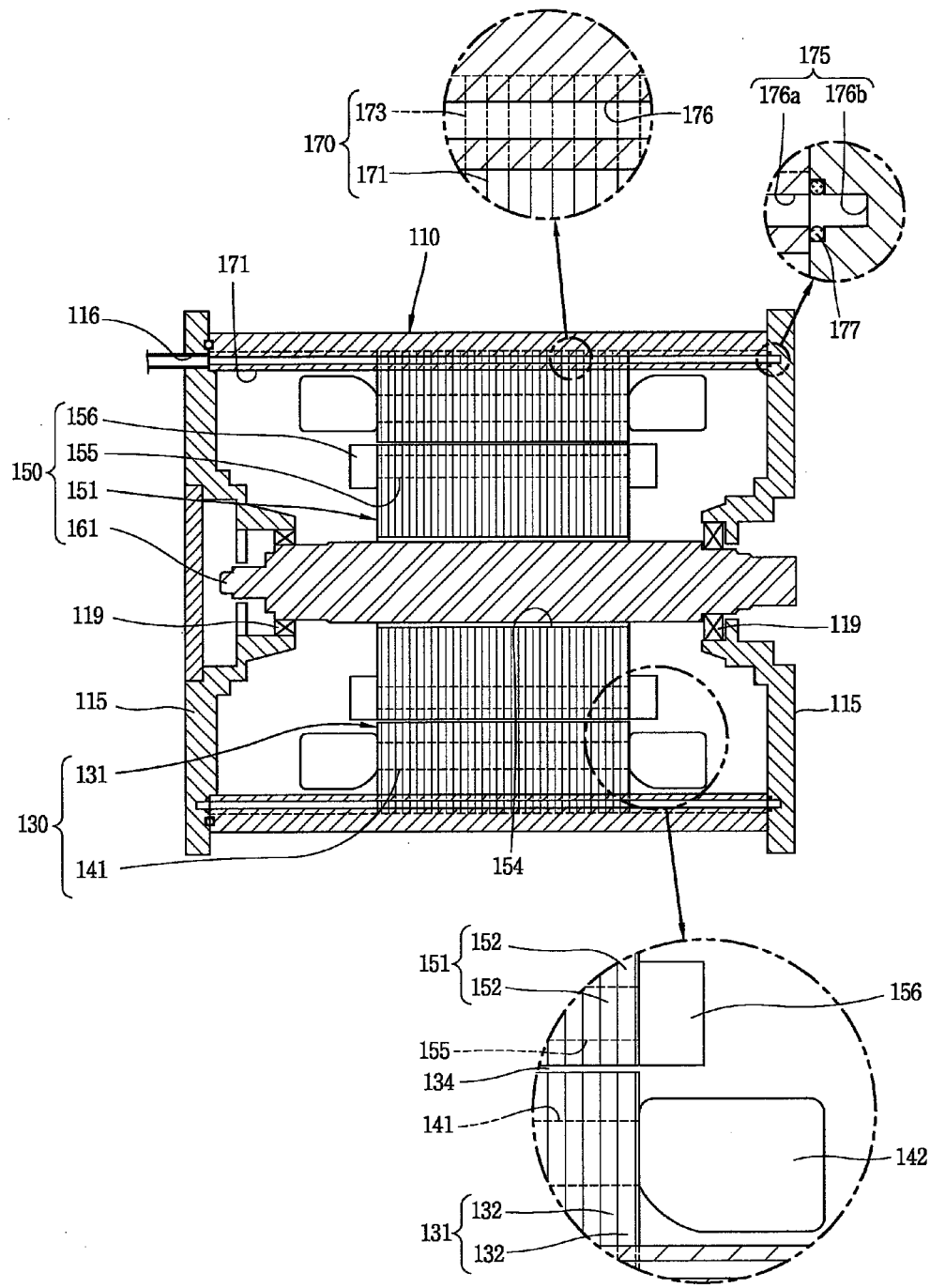
FIG. 2 is a sectional view of an electric motor of FIG. 1.

As shown in FIG. 1, an electric vehicle having an electric motor according to an exemplary embodiment of the present invention may include a vehicle body 10, a battery 25 provided in the vehicle body 10, and an electric motor 105 provided in the vehicle body 10 and connected with the battery 25 to provide driving force to the vehicle body 10.

Although not shown, a passenger space in which a passenger may get on (i.e., ride, board, embark, etc.) may be formed at an upper area of the vehicle body 110.

A plurality of wheels 15 allowing the vehicle to run may be provided at the vehicle body 10.

The wheels 15 may be disposed on front and rear sides of the vehicle body 10.

A suspension 20 may be provided between the vehicle body 10 and the wheels 15 in order to lessen vibration and an impact generated during running (or traveling).

The battery 25 may be provided in the vehicle body 10 in order to supply power.

The battery 25 may be configured as a rechargeable battery which can be recharged.

An electric motor 105 may be provided in the vehicle body 10 in order to provide driving force to the wheels 15.

An inverter device 30 may be provided between the electric motor 105 and the battery 25.

An input cable 32 and an output cable 34 may be provided in the inverter device 30. For example, the input cable 32 may be connected to the battery 25, and the output cable 35 may be connected to the electric motor 105. Accordingly, power provided from the battery 25 may be converted to power required for driving the electric motor 105 and provided to the electric motor 105.

As shown in FIGS. 2 to 5, an electric motor according to one embodiment of the present invention comprises a frame 110, a stator 130 disposed in the frame 110, a rotor 150 disposed to be rotatable with respect to the stator 130, and an engaging portion 170 configured to restrict the stator 130 from moving with respect to the frame 110 in a circumferential direction, wherein the engaging portion 170 includes a rib 171 protruding from one of contact surfaces between the frame 110 and the stator 130, and a rib accommodation portion 173 formed at another of the contact surfaces so as to accommodate the rib 171 therein so that heat can be transferred.

The frame 110 may be configured to have an accommodation space therein. For instance, the frame 110 may be formed to have a cylindrical shape. And, the frame 110 may be formed such that both sides thereof are open.

Covers 115 configured to block openings of the frame 110 may be provided at both ends of the frame 110. For instance, the covers 115 may be detachably coupled to end portions of the frame 110. This may allow two end portions of the frame 110 to be open and closed.

Each cover 115 may be provided with a bearing 119. The bearing 119 may be implemented as a radial bearing.

The stator 130 may be provided in the frame 110.

The stator 130 may include a stator core 131 having a plurality of teeth 135 and a plurality of slots 136, and a stator coil 141 wound on the plurality of slots 136. Here, the stator coil 141 may be configured to be supplied with three-phase AC power.

A rotor accommodation hole 134 configured to accommodate the rotor 150 therein with a predetermined air gap may be provided at the center of the stator core 131. The plurality of teeth 135 and the slots 136 may be formed at the periphery of the rotor accommodation hole 134. The teeth 135 and the slots 136 may be alternately formed in a circumferential direction.

The stator core 131 may be formed by insulation-laminating a plurality of electrical steel sheets 132 with each other, the electrical steel sheets having the rotor accommodation hole 134, the teeth 135 and the slots 136.

The stator coil 141 may be wound on the slots 136.

After the stator coil 141 has been wound on the slots 136, coil ends 142 of the stator coil 141 may be protruding from two end portions of the stator core 131 in an axial direction by a predetermined length.

The rotor 150 may be implemented as an induction rotor having a rotor is core 151 and a plurality of conducting bars 155 inserted into the rotor core 151.

A rotation shaft 161 may be provided at the center of the rotor core 151. The rotation shaft 161 may be rotatably supported by the bearing 119 provided at each cover 115.

The rotor core 151 may be formed by insulation-laminating a plurality of electrical steel sheets 152 with each other.

A shaft hole 154 configured to insert the rotation shaft 161 therein may be penetratingly formed at the center of each electrical steel sheet 152.

The plurality of conducting bars 155 may be disposed to be spacing from each other in a circumferential direction of the rotor core 151.

End rings 156 configured to connect the conducting bars 155 with each other so that the conducting bars 155 can form a closed circuit (or closed loop) may be provided at two end portions of the rotor core 151.

The frame 110 may be provided with a rib 171 protruding from an inner surface of the frame 110 toward a center and extending in an axial direction (axial direction of the rotor 150). Under this configuration, a surface area (inner surface) of the frame 110 may be increased.

The rib 171 may be formed in plurality in number.

Figure 3:
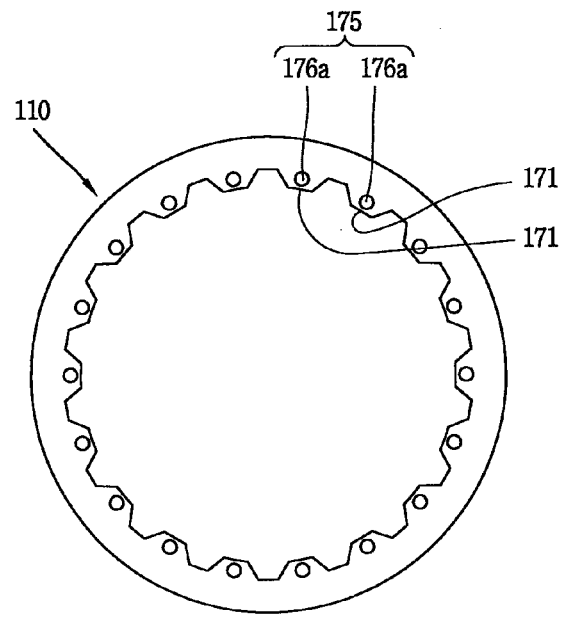
FIG. 3 is a side view of a frame of FIG. 2.
Figure 4:
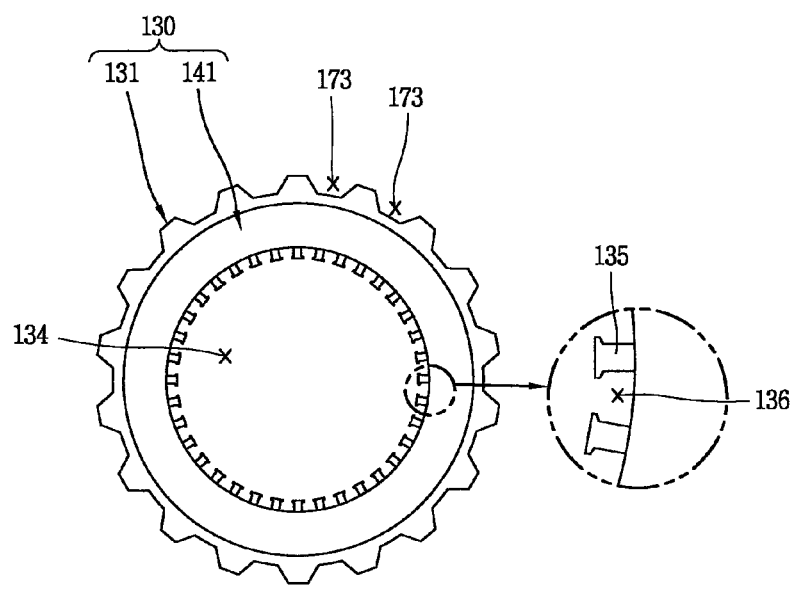
FIG. 4 is a side view of a stator of FIG. 2.
Figure 5:
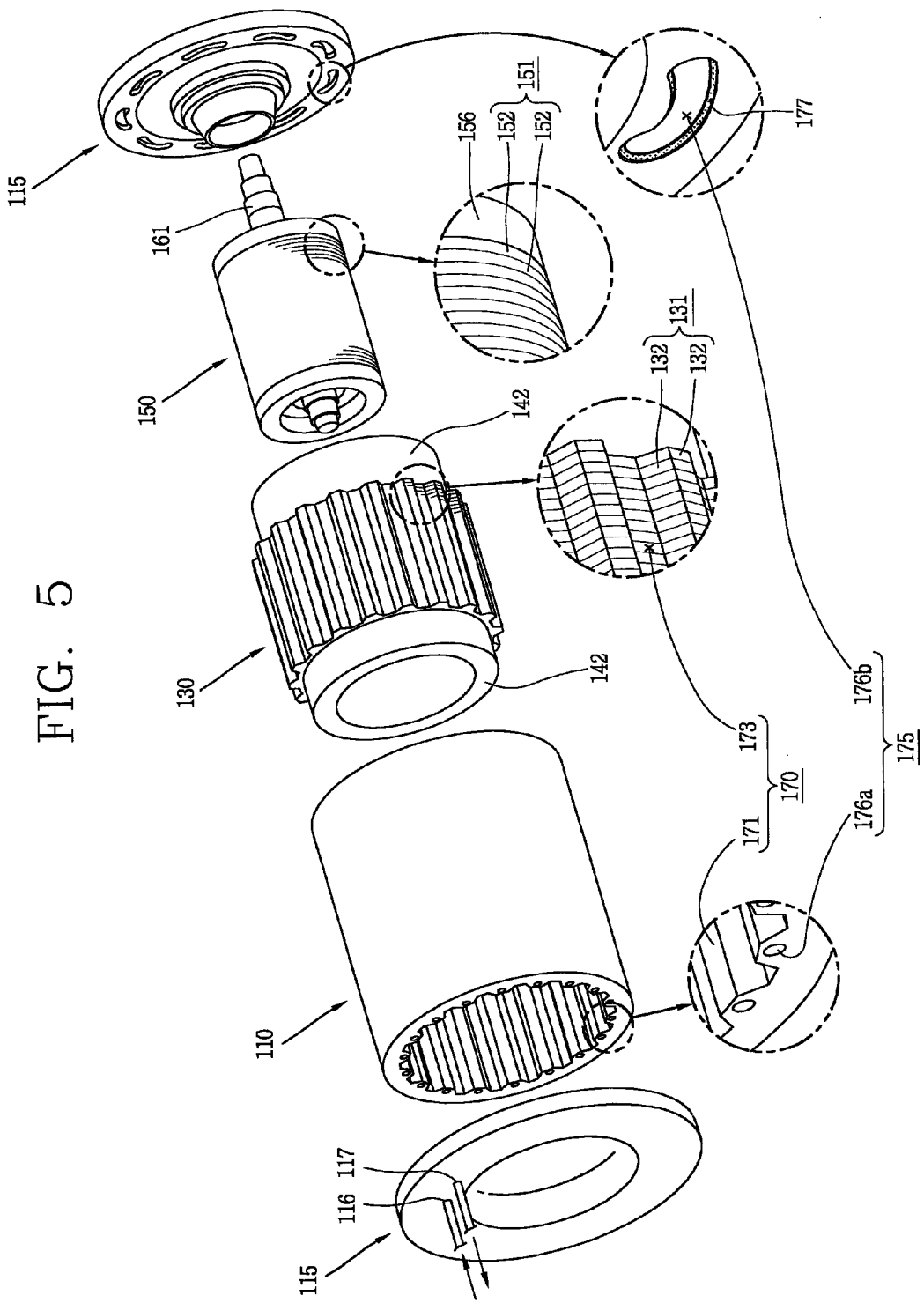
FIG. 5 is a disassembled perspective view of the electric motor of FIG. 2.

As shown in FIG. 3, the plurality of ribs 171 may be formed to be spacing from each other by a predetermined pitch in a circumferential direction of the frame 110.

The rib 171 may be formed in correspondence to an entire length of the frame 110. More concretely, the rib 171 may be formed to have a length equal to a length of the frame 110. Here, a size and the number of the ribs 171 may be properly controlled.

The stator 130 may be provided with a plurality of rib accommodation portions 173 configured to accommodate the ribs 171 of the frame 110 therein so that heat can be transferred.

The plurality of rib accommodation portions 173 may be inwardly concaved from an outer surface of the stator core 131 in a radial direction.

Each rib accommodation portion 173 may be configured to plane-contact an outer surface of each rib 171. Under this configuration, a surface area of the stator 130 may be increased. More concretely, may be increased a heat exchange area (radiating area) of the stator 130, the area having a relatively higher temperature.

The rib accommodation portions 173 are coupled to the ribs 171 in a circumferential direction of the frame 110, thereby preventing the stator 130 from performing a relative motion with respect to the frame 110 (preventing the stator 130 from having a clearance) in a circumferential direction. This may prevent damages of the components due to a clearance of the stator 130, and enhance durability.

The frame 110 may be provided with a cooling path 175 through which a cooling fluid flows. This may cool the frame 110, and may rapidly cool the stator 130 contacting the frame 110 so that heat can be transferred. Since the frame 110 has an increased surface area (heat exchange area) by the ribs 171, a heat exchange amount may be increased.

As shown in FIG. 3, the cooling path 175 may be formed at the rib 171. The cooling path 175 may be penetratingly formed at the rib 171. Under this configuration, the cooling fluid flows at a position closer to the stator coil 141, a heating source for increasing an inner temperature of the frame 110. Accordingly, the stator 130 may be cooled more rapidly. That is, the cooling path 175 is disposed near the stator coil 141, a heating source, so that heat generated from the stator coil 141 is exchanged with the cooling fluid before spreading to the periphery. This may prevent increment of the peripheral temperature due to heat diffusion.

The cooling fluid may be configured to flow via the covers 115.

Each cover 115 may be provided with an inlet 116 for introducing the cooling fluid thereinto and an outlet 117 for discharging the cooling fluid therefrom.

The inlet 116 and the outlet 117 may be formed on the same cover 115, or may be separately formed at different covers 115. Hereinafter, will be explained a case where the inlet 116 and the outlet 117 are formed at the left cover 115.

The cooling path 175 may be provided with linear section portions 176a formed at the ribs 171 and communication portions 176b. Here, each communication portion 176b is configured to communicate the linear section portions 176a with each other. Although not shown, the communication portion 176b may be configured as a connection pipe. For instance, the connection pipe may be formed to have a 'U' shape, and may be configured to communicate the linear section portions 176a with each other by being disposed at end sides of the linear section portions 176a.

The communication portion 176b may be formed at the cover 115. Under this configuration, may be cooled the cover 115 having an increased temperature due to increment of an inner temperature of the frame 110.

The communication portion 176b may be concaved from an inner surface of each cover 115 by a predetermined depth.

More concretely, the communication portion 176b may be implemented in the form of a circular arc which connects the linear section portions 176a of the cooling path 175 in a circumferential direction, the linear section portions 176a formed at the two ribs 171 adjacent to each other.

Figure 6:
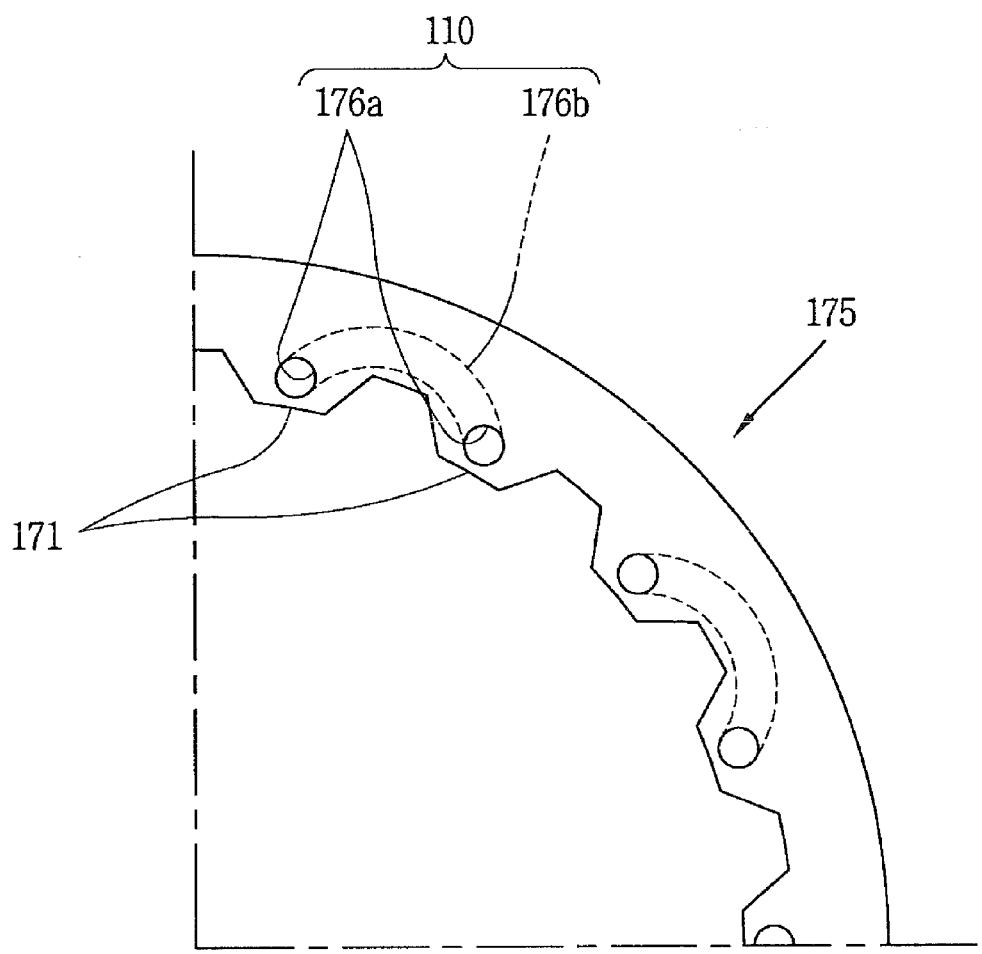
FIG. 6 is a view for explaining a communicated status of a cooling path of FIG. 3.

As shown in FIG. 6, the communication portions 176b may be configured to communicate all the cooling paths 175 formed at the respective ribs 171 with each other in a zigzag form. Under this configuration, the linear section portions 176a and the communication portions 176b of the cooling paths 175 may be integrally connected with each other, thereby forming one moving path for a cooling fluid.

The cooling path 175 may be configured to have a plurality of moving paths for a cooling fluid by controlling the communication portion 176b. More concretely, the cooling path 175 may be configured to have a plurality of inlets 116 and outlets 117. Under this configuration, the cooling fluid may be exchanged with heat generated from the frame 110 more rapidly. This may allow the frame 110 to be cooled more rapidly.

A sealing member 177 configured to prevent leakage of a cooling fluid may be provided at the periphery of the cooling path 175.

Meanwhile, the electric vehicle may include a cooling fluid circulation unit 210 allowing the cooling fluid to circulate by way of the electric motor 1040.

Figure 7:
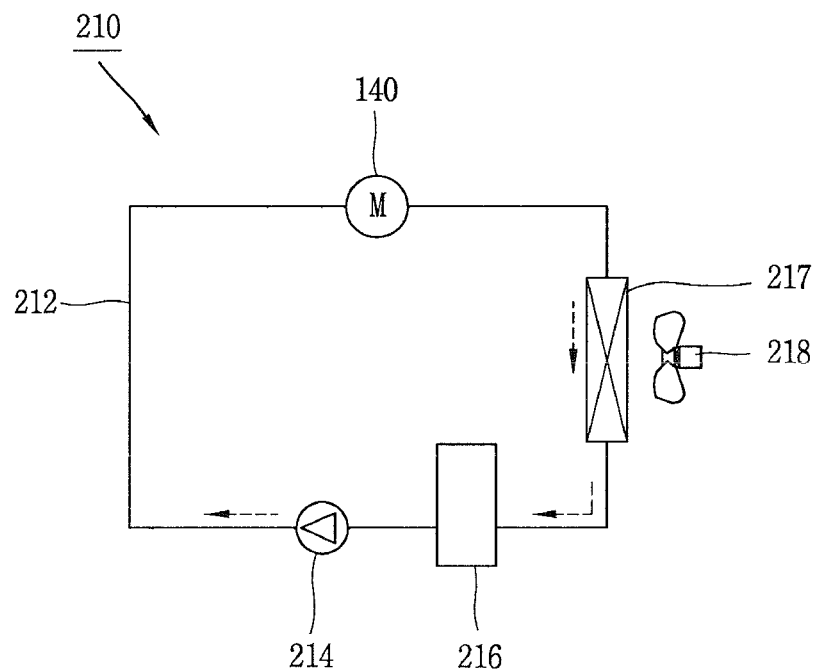
FIG. 7 is a view showing the configuration of a cooling fluid circulation unit of the electric vehicle of FIG. 1.

As shown in FIG. 7, the cooling fluid circulation unit 210 may include a fluid pipe 212 forming a flow path of the cooling fluid and a flow acceleration unit for accelerating the flow of the cooling fluid. The flow acceleration unit for accelerating the flow of the cooling fluid may be implemented as, for example, a pump 214.

The cooling fluid may be configured to circulate by way of the external case 141.

One side of the fluid pipe 212 may be connected to communicate with the cooling fluid inlet unit 185 and the other side of the fluid pipe 212 may be coupled to communicate with the cooling fluid outlet unit 186.

The cooling fluid circulation unit 210 may include a tank 216 for temporarily storing the cooling fluid.

The tank 216 may be disposed at the entrance (upper stream side) of the pump 214.

The cooling fluid circulation unit 210 may include a radiator 217 allowing the cooling fluid to heat-exchange with air so as to be cooled therethrough. Accordingly, the cooling fluid at a temperature which has been increased while having passed through the electric motor 140 can be cooled.

A cooling fan 218 may be provided at one side of the radiator 217 may include a cooling fan 218 accelerating the flow of air in contact with the radiator 217.

The electric vehicle according to the present exemplary embodiment may include a controller 220 having a control program.

Figure 8:
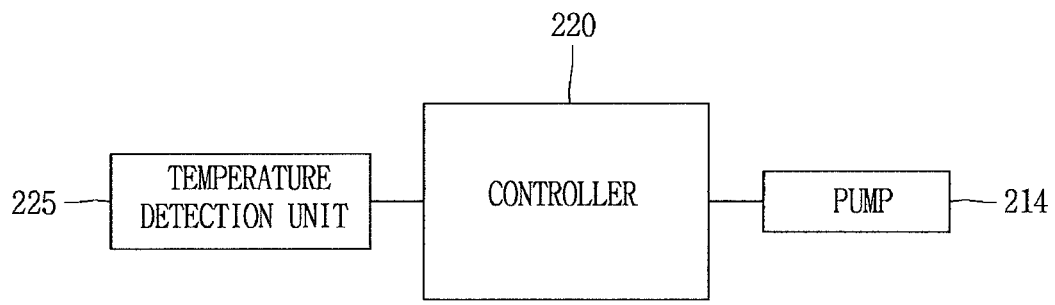
FIG. 8 is a schematic block diagram of the electric vehicle of FIG. 1.

As shown in FIG. 8, the controller 220 may be configured to detect the temperature of the cooling fluid to regulate a flow speed of the cooling fluid.

A temperature detection unit 225 for detecting the temperature of the cooling fluid may be connected to the controller 220 in order to output a detection signal. The temperature detection unit 225 may output the detection temperature of the cooling fluid, as an electrical signal, to the controller 220.

The pump 214 may be connected to the controller 220 such that it can be controlled by the controller 220.

Once a driving is started, power is supplied to the stator coil 141. Then, a magnetic field (rotation magnetic field) may be formed at the stator coil 141.

Once a magnetic field is formed at the stator coil 141, an induction current may be generated from the rotor 150 by electromagnetic induction (EMI).

The rotor 150 may rotate centering around the rotation shaft 161 by an interaction (attractive force or repulsive force) with the stator 130.

Owing to the engaging portion 170 having the ribs 171 and the rib accommodation portions 173, the stator 130 may be prevented from having a clearance from the frame 110 in a circumferential direction. This may prevent damages of the components due to a clearance of the stator 130 in a circumferential direction, and may prolong the lifespan of the electric motor.

Once power is supplied to the stator coil 141 and the rotor 150 starts to rotate, an inner temperature of the frame 110 may be increased due to copper loss, iron loss, mechanical loss, etc.

While the electric motor is driven, a cooling fluid may be supplied to the cooling path 175. More concretely, the cooling fluid may be supplied to the cooling path 175 consecutively or after reaching a predetermined temperature.

The cooling fluid introduced into the cooling path 175 through the inlet 116 may absorb peripheral heat while moving along the cooling path 175. This may rapidly lower an inner temperature of the frame 110.

The frame 110 has an increased inner surface area by the ribs 171, thereby rapidly absorbing peripheral heat. This may rapidly lower not only temperatures of the frame 110 and the stator 130, but also a temperature of an inner space of the frame 110. Accordingly, may be prevented lowering of an output density and efficiency of the electric motor due to temperature increment of the electric motor. As a result, may be implemented an electric motor for an electric vehicle having a high output density and high efficiency.

The cooling fluid having absorbed peripheral heat while moving along the cooling path 175 may be discharged to the outside of the frame 110 through the outlet 117. Then, the cooling fluid discharged to the outside of the frame 110 may be introduced into the cooling path 175 through the inlet 116. As these processes are repeatedly performed, a cooling operation for the electric motor may be continuously performed.

The electric motor may be provided with coolant cooling means (not shown) configured to cool the cooling fluid. The cooling fluid discharged to the outside of the frame 110 is cooled by the coolant cooling means, and then is introduced into the frame 110 through the inlet 116. This may allow the frame 110 to be cooled more rapidly.

Hereinafter, another embodiment of the present invention will be explained with reference to FIGS. 9 to 12.

The same parts as those of the aforementioned embodiment will be provided with the same reference numerals, and detailed explanations thereof will be omitted for convenience.

Figure 9:
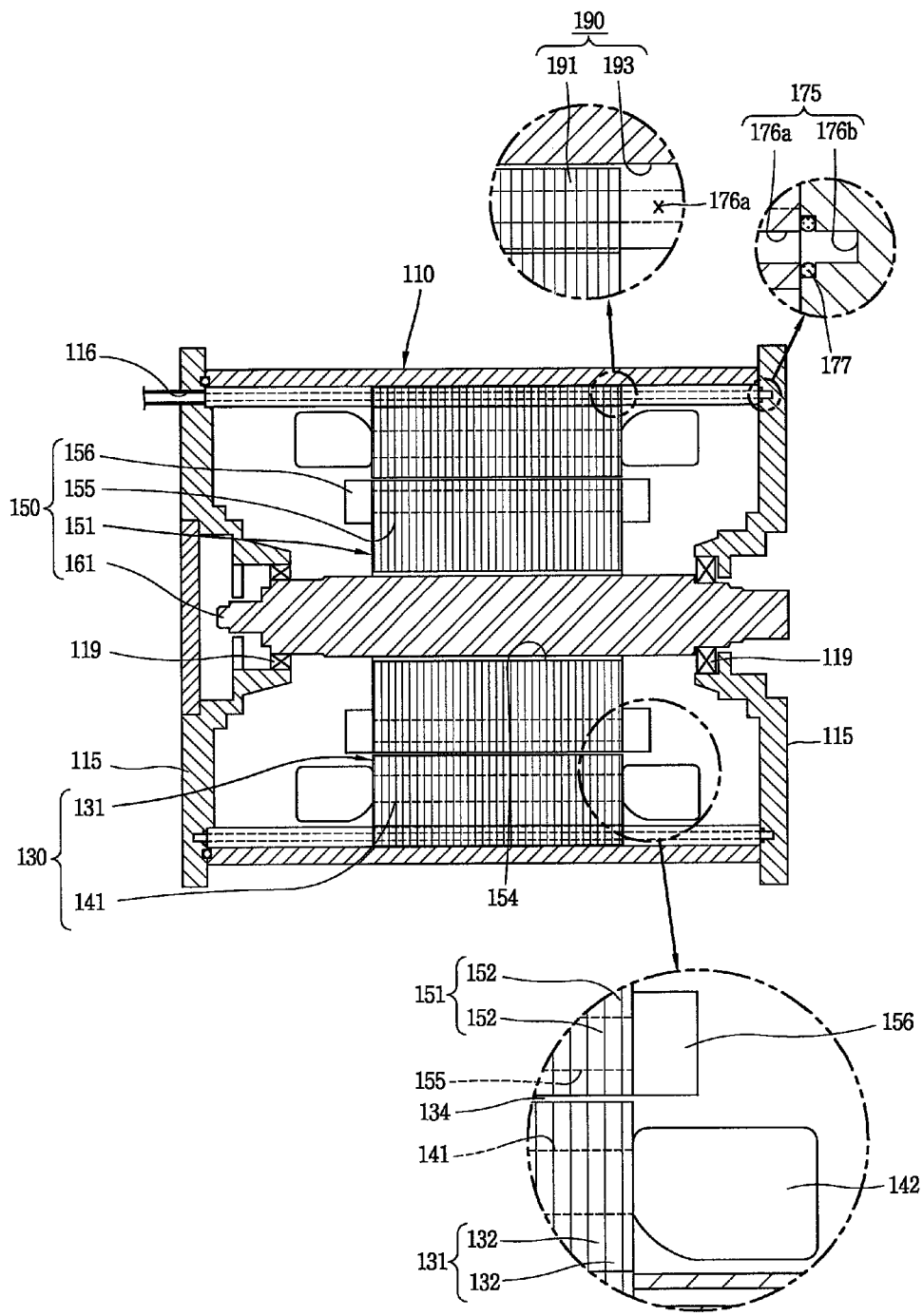
FIG. 9 is a sectional view of an electric motor according to another embodiment of the present invention.
Figure 10:
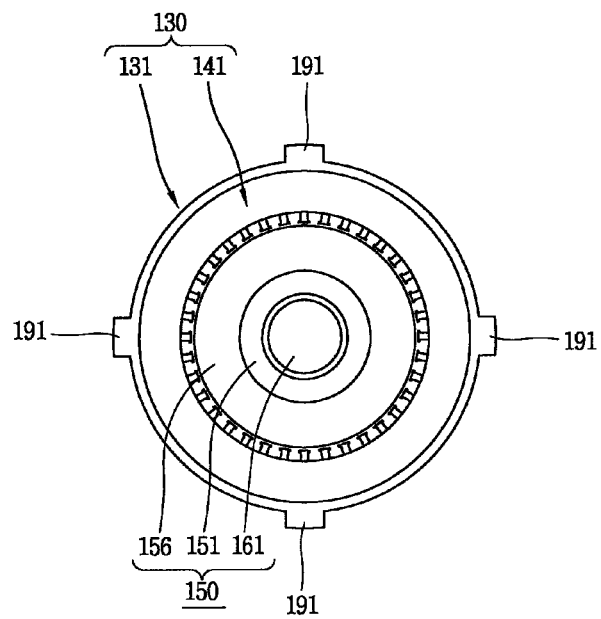
FIG. 10 is a side view of a stator of FIG. 9.
Figure 11:
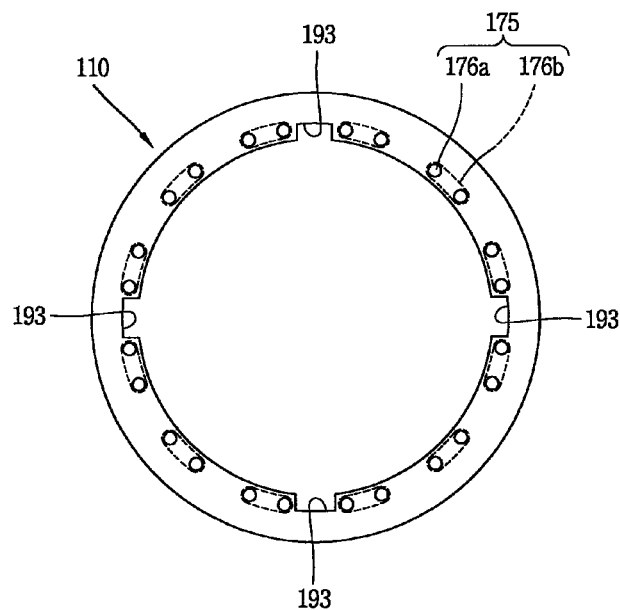
FIG. 11 is a side view of a frame of FIG. 9.

As shown in FIGS. 9 to 11, an electric motor according to another embodiment of the present invention comprises a frame 110, a stator 130 disposed in the frame 110, a rotor 150 disposed to be rotatable with respect to the stator 130, and an engaging portion 190 configured to restrict the stator 130 from moving with respect to the frame 110 in a circumferential direction, wherein the engaging portion 190 includes a rib 191 protruding from one of contact surfaces between the frame 110 and the stator 130, and a rib accommodation portion 193 formed at another of the contact surfaces so as to accommodate the rib 191 therein so that heat can be transferred.

The frame 110 may be formed in a cylindrical shape with an accommodation space therein. Here, both sides of the accommodation space are open.

Covers 115 may be provided at both ends of the frame 110.

The stator 130 may be provided in the frame 110, and the rotor 150 may be disposed in the stator 130. The rotor 150 may be provided with a rotation shaft 161. The stator 130 and the rotor 150 may be implemented as a three-phase induction electric motor.

The stator 130 may include a stator core 131 having a rotor accommodation hole 134 therein, and a stator coil 141 wound on the stator core 131.

The rotor 150 may include a rotor core 151 having a shaft hole at the center thereof, a plurality of conducting bars 155 provided at the rotor core 151, and end rings 156.

As shown in FIG. 10, the ribs 191 may be protruding from an outer surface of the stator 130 towards the frame 110. Under this configuration, an outer surface (surface area) of the stator 130 may be extended. The ribs 191 may accelerate a radiating operation of the stator 130.

More concretely, the ribs 191 may be protruding from an outer surface of the stator core 131 in a radial direction, and may be extending in an axial direction.

The ribs 191 may be formed in plurality in number. In this preferred embodiment, the number of the ribs 191 is four. However, the number of the ribs 191 is not limited to this, but may be properly controlled.

The rib 191 may be formed to have a length equal to a lamination thickness (or a width in an axial direction) of the stator core 131.

As shown in FIG. 11, the frame 110 may be provided with a plurality of rib accommodation portions 193 configured to accommodate therein the ribs 191 of the stator 130.

Each rib accommodation portion 193 may be configured to plane-contact each rib 191. Under this configuration, heat generated from the ribs 191 may be rapidly transferred to the rib accommodation portions 193.

As the ribs 191 and the rib accommodation portions 193 are engaged with each other in a circumferential direction, a clearance of the frame 110 in a circumferential direction may be prevented.

Furthermore, as an inner surface (surface area) of the frame 110 is extended by the rib accommodation portions 193, a heat exchange area of the frame 110 with air inside the frame 110 may be increased.

The frame 110 may be provided with cooling paths 175 through which a cooling fluid flows. This may cool the frame 110, and may rapidly cool the stator 130 contacting the frame 110 so that heat can be transferred.

The cooling paths 175 may be formed along the rib accommodation portions 193. For instance, some of the cooling paths 175 may be disposed to be adjacent to two sides of the rib accommodation portions 193. Under this configuration, the ribs 191 accommodated in the rib accommodation portions 193 may be rapidly cooled.

The cooling path 175 may include linear section portions 176a, and communication portions 176b configured to communicate the linear section portions 176a with each other.

The communication portions 176b may be formed at the cover 115.

Figure 12:
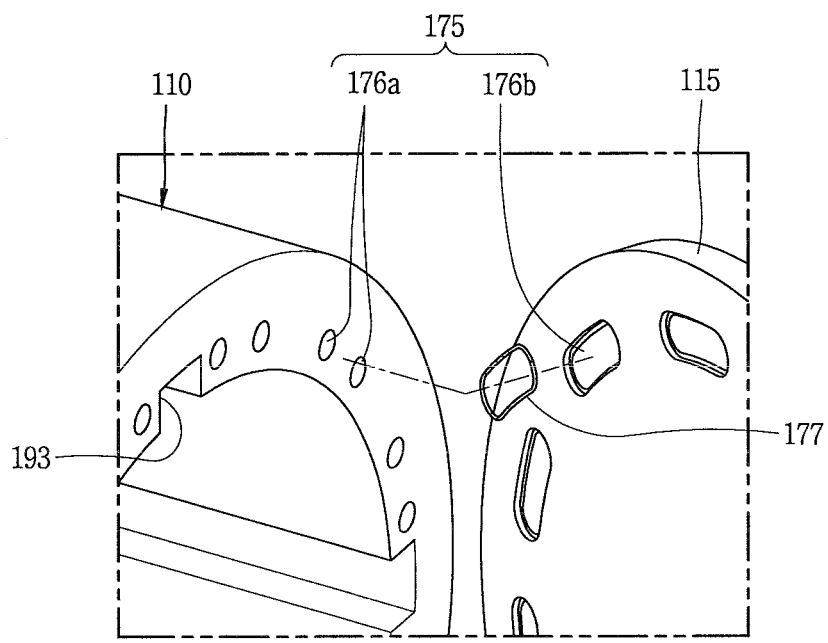
FIG. 12 is a view for explaining a communicated status of a cooling path of FIG. 11.

As shown in FIG. 12, each of the communication portions 176b may be configured to communicate two neighboring linear section portions 176a with each other. The cooling path 175 may be implemented as one moving path having one inlet 116 and one outlet 117. Alternatively, the cooling path 175 may be implemented as a plurality of moving paths having a plurality of inlets 116 and a plurality of outlets 117.

The linear section portions 176a of the cooling path 175 may be disposed to be adjacent to two sides of the rib accommodation portion 193. This may allow the ribs 191 to be more rapidly cooled.

The linear section portions 176a of the cooling path 175 may be disposed to be closer to the rotation shaft 161 of the rotor 150 than the end portion of the rib 191 in a radial direction of the rotor 150. Since the linear section portions 176a of the cooling path 175 are more adjacent to the stator 130, the stator 130 may be cooled more rapidly.

Once the electric motor is driven, a magnetic field is formed at the stator coil 141. And, the rotor 150 may rotate centering around the rotation shaft 161 by interworking with the stator 130.

The engaging portion 190 prevents the stator 130 from relatively moving in a circumferential direction of the frame 110. This may prevent damages of the components due to a clearance of the stator 130 in a circumferential direction. Accordingly, the lifespan of the electric motor may be prolonged.

While the electric motor is driven, a cooling fluid may be supplied to the cooling path 175. The cooling fluid introduced into the cooling path 175 through the inlet 116 may absorb peripheral heat while moving along the cooling path 175.

Since an outer surface (surface area) of the stator 130 is extended by the plurality of ribs 191, the stator 130 may radiate heat more rapidly. This may allow the stator 130 to be cooled more rapidly.

Since an inner surface (heat absorbing area) of the frame 110 is extended by the plurality of rib accommodation portions 193, the frame 110 may absorb peripheral heat more rapidly. Accordingly, the frame 110 and the stator 130 may be cooled more rapidly. This may prevent lowering of an output density and efficiency due to a high temperature, and may implement an electric motor for an electric vehicle having a high output density and high efficiency.

The cooling fluid having absorbed peripheral heat while moving along the cooling path 175 may be discharged to the outside of the frame 110 through the outlet 117. Then, the cooling fluid discharged to the outside of the frame 110 may be introduced into the cooling path 175 through the inlet 116. As these processes are repeatedly performed, a cooling operation for the electric motor may be continuously performed.

The present invention may have the following advantages.

Firstly, the engaging portion includes the rib protruding from one of contact surfaces between the frame and the stator, and the rib accommodation portion formed at another of the contact surfaces so as to accommodate the rib therein such that heat is transferred. This may increase a heat exchange area between the frame and the stator, thereby rapidly cooling the stator. This may prevent lowering of an output density and efficiency due to a high temperature, and may implement an electric motor for an electric vehicle having a high output density and high efficiency.

Secondly, the rib is protruding in a radial direction, and is accommodated in the rib accommodation portion concaved in a radial direction. This may prevent the stator from moving with respect to the frame in a circumferential direction. As a result, an electric motor having enhanced durability may be implemented.

Thirdly, the frame is provided with the ribs protruding from an inner surface of the frame in a radial direction and extending in an axial direction, and the cooling paths formed at the ribs. This may allow the cooling paths to be more adjacent to the stator. As a result, the stator may be cooled more rapidly.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electric vehicle comprising:
   a body;
   a plurality of wheels provided at the body;
   an electromotor to drive at least one wheel, the electromotor including,
   a frame,
   a stator disposed in the frame,
   a rotor disposed to be rotatable with respect to the stator, and
   an engaging portion that restricts the stator from moving with respect to the frame in a circumferential direction, the engaging portion including at least one rib protruding from one of surfaces of the frame and the stator, and at least one rib accommodation portion formed at an other opposing surface of the surfaces of the frame and the stator, wherein the at least one rib and the at least one accommodation portion are engaged to allow heat to be transferred therebetween, wherein the frame has a length longer than the stator in an axial direction, wherein the frame has one of the at least one rib and the at least one rib accommodation portion, which has the same length as the length of the frame, and wherein at least one cooling path is formed at the frame;
   a battery provided in the body; and
   an inverter coupled between the battery and the electromotor, the inverter including a plurality of elements to convert direct current (DC) power to alternating current (AC) power.

2. The electric vehicle of claim 1, wherein a surface of the at least one rib makes contact with a surface of the at least one rib accommodation portion.

3. The electric vehicle of claim 1, wherein the at least one rib comprises a plurality of ribs formed to be spaced from each other by a predetermined pitch at one of the surfaces of the frame and the stator.

4. The electric vehicle of claim 1, wherein the at least one rib accommodation portion comprises a plurality of rib accommodation portions formed to be spaced from each other by a predetermined pitch at one of the surfaces of the frame and the stator.

5. The electric vehicle of claim 1, wherein the at least one cooling path is formed at the at least one rib.

6. The electric vehicle of claim 1, wherein the at least one cooling path is formed at the frame in a vicinity of the at least one rib accommodation portion.

7. The electric vehicle of claim 1, wherein the at least one cooling path comprises a plurality of cooling paths, each cooling path penetrating the frame from one end surface to another end surface of the frame.

8. The electric vehicle of claim 7, further comprising:
   at least two covers, one cover covering the one end surface of the frame and another cover covering the another end surface of the frame; and
   at least one communication portion formed at one of the at least two covers, wherein the at least one communication portion connects at least two of the cooling paths.

9. The electric vehicle of claim 8, further comprising:
   at least one inlet in fluid communication with at least one of the cooling path;
   at least one outlet in fluid communication with the at least one of the cooling path; and
   a cooling fluid circulation circuit coupled to the at least one of the inlet and the at least one of the outlet to form a fluid flow path.

10. A motor for an electric vehicle comprising:
    a frame;
    a stator disposed in the frame;
    a rotor disposed to be rotatable with respect to the stator; and
    an engaging portion that restricts the stator from moving with respect to the frame in a circumferential direction, the engaging portion including at least one rib protruding from one of the surfaces of the frame and the stator, and at least one rib accommodation portion formed at other of the surfaces of the frame and the stator, wherein the at least one rib and the at least one accommodation portion are engaged to allow heat to be transferred therebetween.
    wherein the frame has a length longer than the stator in an axial direction,
    wherein the frame has one of the at least one rib and the at least one rib accommodation portion, which has the same length as the length of the frame, and
    wherein at least one cooling path is formed at the frame.

11. The motor of claim 10, wherein a surface of the at least one rib makes contact with a surface of the at least one rib accommodation portion.

12. The motor of claim 10, wherein the at least one rib comprises a plurality of ribs formed to be spaced from each other by a predetermined pitch at one of the surfaces of the frame and the stator.

13. The motor of claim 10, wherein the at least one rib accommodation portion comprises a plurality of rib accommodation portions formed to be spaced from each other by a predetermined pitch at one of the surfaces of the frame and the stator.

14. The motor of claim 10, wherein the at least one cooling path is formed at the at least one rib of the frame.

15. The motor of claim 10, wherein the at least one cooling path is formed at the frame in a vicinity of the at least one rib accommodation portion.

16. The motor of claim 10, wherein the at least one cooling path comprises a plurality of cooling paths, each cooling path penetrating the frame from one end surface to another end surface of the frame.

17. The motor of claim 16, further comprising:
    at least two covers, one cover covering the one end surface of the frame and another cover covering the another end surface of the frame; and
    at least one communication portion formed at one of the at least two covers, wherein the at least one communication portion connects at least two of the cooling paths such that a zigzag fluid flow path is formed.

18. The motor of claim 17, further comprising:
    at least one inlet in fluid communication with at least one of the cooling path; and
    at least one outlet in fluid communication with at least one of the cooling path.

* * * * *